United States Patent Office 3,059,321
Patented Oct. 23, 1962

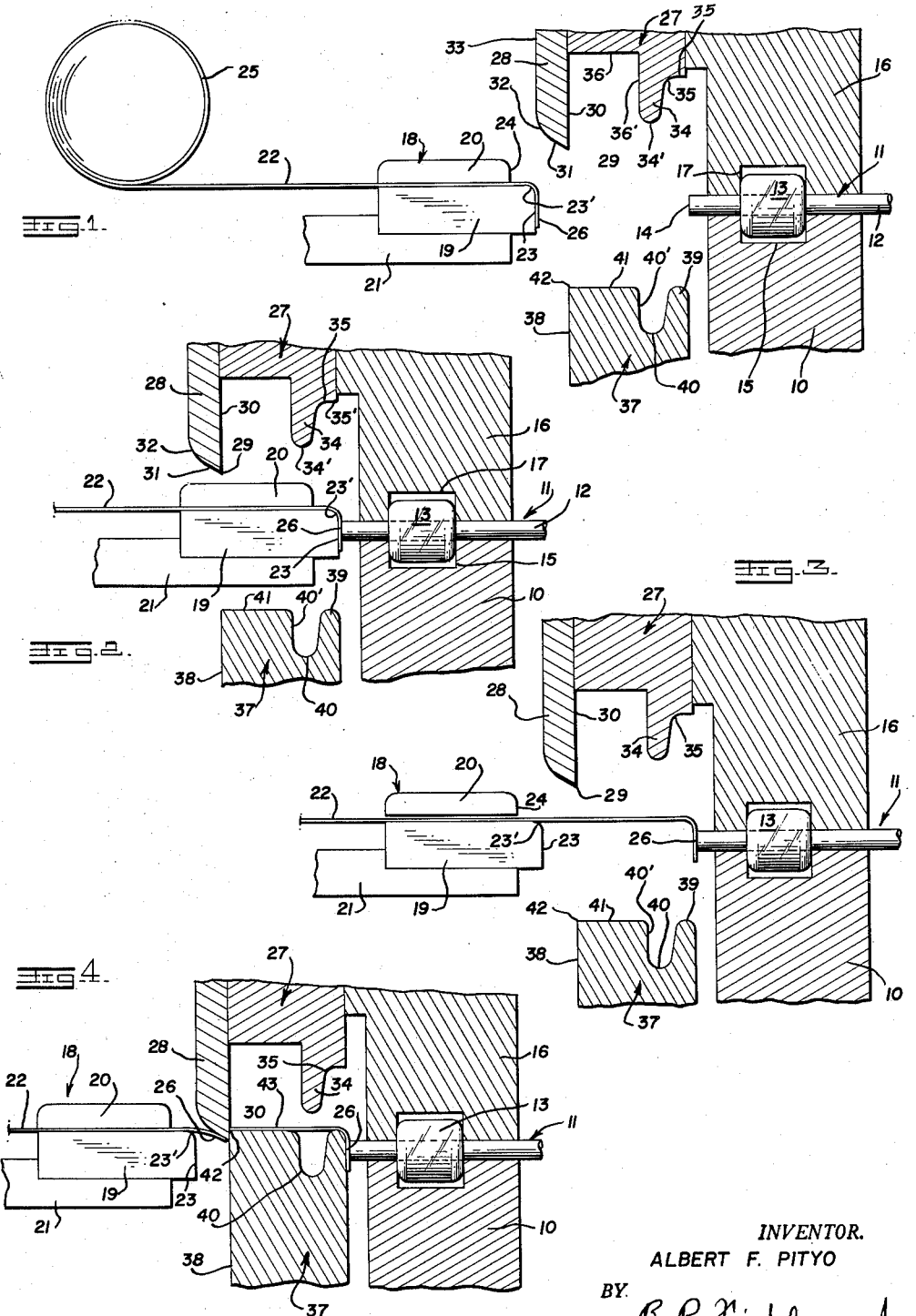

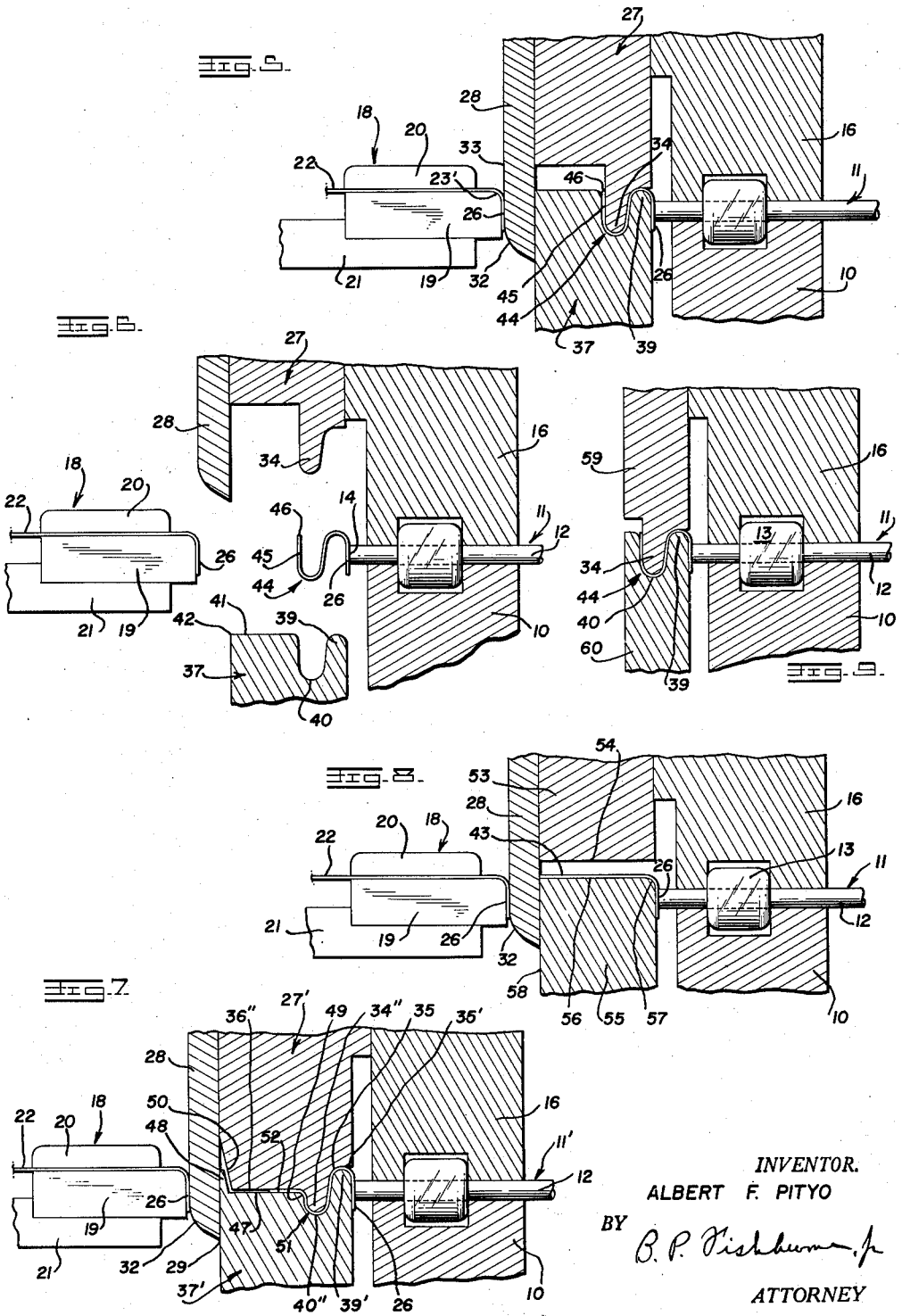

3,059,321
METHOD OF MAKING DIODE ELEMENTS
Albert F. Pityo, 1384 Pompton Ave., Cedar Grove, N.J.
Filed June 30, 1959, Ser. No. 823,865
3 Claims. (Cl. 29—155.5)

This invention relates to a method of making diode elements or the like.

My prior Patent 2,779,993, February 5, 1957, Method of Producing a Diode Element, discloses a method wherein a wire is fed into longitudinal overlapping relation with one end portion of a pin or anode and electrically welded thereto. Subsequent to welding, the wire is formed by laterally operating die means into the configuration of a cat whisker or point contact element. Subsequent to completion of the wire forming operation, the wire is severed by a cutting member associated with the forming die means to complete the formation of the cat whisker.

The present invention is an improvement upon the method disclosed in my mentioned prior patent. By the method of the present invention, a fine wire having a preformed transverse leading extension is fed into longitudinal abutting relation with an anode, which anode may be in the form of a prefabricated lead wire having a glass bead hermetically sealed thereon. By the present method, the mentioned transverse extension of the fine wire is electrically butt welded to the leading end of the anode, and subsequent to welding, the fine wire is severed transversely at a point spaced from the welded transverse extension. During the severing step, another transverse extension on the fine wire is bent over and formed by the severing means. Subsequent to severing the fine wire, the portion thereof which is welded to the anode is now formed by laterally operating forming die means to impart thereto the desired configuration of the cat whisker, and the cat whisker may thus be formed substantially S-shaped, or the like. The cycle of operation of the apparatus employed in the practice of the method herein may be continuous, rapid and extremely accurate.

An object of the invention is to provide a method of making diode elements of the above-mentioned character, which method may be carried out at a single work station or at a plurality of work stations.

A further object is to provide a method of the above-mentioned character, wherein the fine wire severing means operates in advance of the forming means and serves the dual purpose of severing the fine wire to provide for the subsequent formation of one cat whisker, and simultaneously forming a transverse extension upon the succeeding length of fine wire to facilitate the subsequent welding of the fine wire to the end of the next succeeding anode.

Another object is to provide in a method of the above-mentioned character welding electrode means which also functions in the method to feed the fine wire forwardly toward the anode.

Other objects and advantages of the invention will become apparent during the course of the following detailed description.

In the accompanying drawings forming a part of this application and in which like numerals are employed to designate like parts throughout the same, FIGURE 1 is a fragmentary vertical section, partly diagrammatic, through apparatus employed in the practice of the method and showing the same in its operative position with respect to the work at the beginning of the method.

FIGURE 2 is a fragmentary vertical sectional view similar to FIGURE 1 showing the apparatus positioned for carrying out the next succeeding step of the method.

FIGURE 3 is a view similar to FIGURES 1 and 2 showing a further adjusted position of the apparatus during the practice of the method.

FIGURE 4 is a further view similar to FIGURE 3 showing the position of the apparatus in the next succeeding step of the method.

FIGURE 5 is a further view of the apparatus similar to the previous views and showing the apparatus positioned during a subsequent step of the method.

FIGURE 6 is still another view similar to the previously described views showing the apparatus positioned at the end of the method, and prior to repeating the cycle of operation.

FIGURE 7 is a fragmentary vertical section through apparatus employed in a slight modification of the method, partly diagrammatic.

FIGURE 8 is a similar view, partly digrammatic, of a modified form of apparatus employed at a first work station, in accordance with a modification of the method.

FIGURE 9 is a further view similar to FIGURE 8 of apparatus employed at a second work station in accordance with the last named modification.

In the drawings, wherein for the purpose of illustration are shown preferred embodiments of the invenion, attention is directed first to FIGURES 1 through 6, wherein the numeral 10 designates a stationary anvil or support for an anode 11, in the form of a relatively stiff prefabricated lead wire 12 having a glass bead 13 hermetically sealed thereon, near and inwardly of the forward end 14 of the lead wire 12. The anvil 10 has an upper recess 15 to receive the glass bead 13, and through the medium of the glass bead to position the anode 11 accurately with respect to the feeding, welding, severing and forming means to be described.

A vertically reciprocatory presser jaw 16 is arranged above the anvil 10 for cooperation therewith in clamping and holding the anode 11 in accurate fixed relation to the other apparatus elements. The jaw 16 also has a recess 17 in its lower end to receive the glass bead 13, as shown. The clamping jaw 16 is movable vertically toward and away from the anvil 10 in the desired timed manner by any suitable means, not shown.

The end 14 of the lead wire 12 projects a slight distance forwardly of corresponding sides of the anvil 10 and clamping jaw 16, as shown in the drawings.

Arranged in longitudinally opposed relation to the anode 11, and spaced from the anvil 10 and clamping jaw 16 is a combined reciprocatory fine wire feeding and welding means 18, including a lower jaw electrode 19 and an upper gripping and feeding jaw 20 associated therewith. The fine wire feeding and welding means 18 are movably mounted for reciprocation toward and from the anode 11 upon a suitable guide or support 21. The means 18 is reciprocated as a unit in properly timed relation to the other elements of the apparatus by any suitable means, not shown. The upper clamping jaw 20 is mounted for limited movement relative to the lower jaw electrode 19, so that the two jaws 19 and 20 may grip and feed the fine wire 22 toward the anode 11 or slide rearwardly with respect to the fine wire 22 during the practice of the method, as will be further described.

The jaw electrode 19 has a leading end 23 extending at right angles to the opposed longitudinal faces of the jaws 19 and 20 and in parallel opposed relation to the end 14 of lead wire 12. The jaw electrode 19 has a rounded forming shoulder 23' at its upper leading corner, substantially in advance of the leading end 24 of upper gripping jaw 20. The metal ribbon 22 is fed from a coil or source 25, as indicated diagrammatically in FIGURE 1. The portion of the fine wire 22 arranged between the jaws 19 and 20, FIGURE 1, is at an elevation slightly above that of the lead wire 12.

A short downturned leading transverse extension 26,

FIGURE 1, is formed on the fine wire 22 and lies against the end 23 and shoulder 23' of jaw electrode 19. This extension 26 is in spaced opposed relation to the end 14 of lead wire 12 at the start of the method. The lateral extension 26 has been formed by the preceding cycle of operation of the apparatus during the practice of the method, as will become apparent during the following description.

Arranged upon opposite sides of the anode 11 and the feeding and welding means 18 and operable by reciprocation at right angles thereto, and independently of the reciprocatory jaw 16 is an upper forming die or punch 27, having fixedly secured to one side thereof for movement therewith a cutting blade 28. The forming die 27 and the blade 28 are guided during reciprocation by any suitable means and are operated in properly timed relation with the other elements of the apparatus by means, not shown. The same is true of the reciprocatory jaw 16 which slidably contacts the side of the die 27 remote from the cutter blade 28. As shown in FIGURE 1, the cutter blade 28 extends below the lower extremity of the die 27 and has a leading sharp cutting edge 29 formed by a flat face 30 of the blade 28 and an inclined or beveled face 31 having a preferably rounded shoulder 32.

The outer face 33 of the blade 28 extends at right angles to the jaw electrode 19 and in alignment with the leading end 23 thereof, to facilitate the formation of the transverse extension 26 upon the fine wire 22.

The upper die 27, FIGURE 1, has a depending forming projection 34 with a rounded leading end 34', as shown. The projection 34 is spaced laterally of the cutting blade 28 and has its leading end 34' terminating inwardly or above the cutting edge 29. The die 27 has a fillet 35 at the top of the projection 34 and on the side thereof remote from the blade 28, and the fillet 35 leads to a square shoulder 35' at the adjacent face of the clamping jaw 16. The die 27 has a flat face or shoulder 36 upon the other side of the projection 34, at right angles to the longitudinal face 36' of the projection and at right angles to the face 30 of the cutting blade. The shoulder 36 is spaced a considerable distance inwardly or above the shoulder 35' as shown in FIGURE 1. If preferred, the shoulder 36 may be formed integral with the cutting blade 28 rather than the die 27, in which case the longitudinal face 36' of projection 34 will define one side of the die throughout its length.

A cooperating lower reciprocatory forming die 37 is arranged in opposition to the upper die 27 and also operates at right angles to the feeding and welding unit 18 and the anode 11. The outer longitudinal face 38 of the lower die 37 is arranged in alignment with the longitudinal face 30 of the cutting blade 28, FIGURE 1. At its upper end, the die 37 is provided upon one side with an elongated rounded projection 39 adapted to interfit with the fillet 35 and the adjacent side of the depending projection 34 of the upper forming die. The lower die 37 has a deep concave recess 40 adjacent to the projection 39, shaped to receive the depending die projection 34. The lower die 37 has a wide flat top face 41 arranged in opposition to the shoulder 36 and at the elevation of the top of the die projection 39. The top face 41 of the lower die 37 is arranged at right angles to the die face 38 and forms therewith a square corner 42 for shearing engagement with the cutting edge 29. The die face 41 is also arranged at right angles to the side wall 40' of the die recess 40, and the side wall 40' is in alignment with the longitudinal face 36' of the upper die projection 34.

With continued reference to the drawings, the steps of the method are illustrated successively by FIGURES 1 through 6.

FIGURE 1 shows the relative positions of the apparatus components and work elements at the start of the method. The anode 11 has been placed upon the anvil 10 by hand or by suitable automatic means, and the clamping jaw 16 has descended into clamping engagement with the anode, as shown. The anode 11 is thus firmly held in fixed relation to the stationary anvil 10.

The feeding and welding unit 18 is now positioned at the extreme outer limit of its travel away from the anode 11, and the clamping jaw 20 is firmly clamping the fine wire 22 against the longitudinal face of the jaw electrode 19. The bent over transverse extension 26 has been formed during the previous cycle of operation of the apparatus used in the practice of the method. The upper die 27 and cutter 28 carried thereby, and the lower die 37, are now separated a maximum amount and are at the outer end of their travel, so that the feeding and welding means 18 may enter between them.

With reference to FIGURE 2, the feeding and welding means 18 is now shifted toward the anode 11 and the transverse extension 26 is pressed into contact with the end 14 of lead wire 12 by the jaw electrode 19. At this time, the welding circuit is now closed for the proper length of time and opened by timing means, not shown, and during this interval, the transverse extension 26 of the fine wire 22 is electrically welded to the end 14 of lead wire 12. The jaw electrode 19 is of course suitably insulated from the supporting guide 21 and the upper gripping jaw 20, so that the welding circuit will be through the electrode 19, extension 26 and lead wire 12. The lead wire 12 is also electrically insulated from the anvil 10 and clamping jaw 16, and these latter elements may either be formed entirely of electrical insulating material or faced with such material at their points of engagement with the lead wire 12, die 27 and other metallic parts of the apparatus, which would otherwise cause short circuiting.

As shown in FIGURE 3, subsequent to the welding of the extension 26 to the end 14 of lead wire 12, the gripping action of the jaw 20 upon the fine wire 22 is relaxed and the feeding and welding unit 18 slides rearwardly relative to the fine wire 22 and guide 21. The unit 18 returns to the outer limit of its travel, which is the position shown in FIGURES 1 and 3. The fine wire 22 is now still intact and unsevered, and the transverse extension 26 is securely welded to the end of the anode 11, FIGURE 3.

In the next succeeding step of the method, FIGURE 4, the anode 11 continues to be held between the anvil 10 and jaw 16 and the feeding and welding unit 18 remains at the outer extremity of its travel. At this time, the upper die 27 and cutter 28 carried thereby and the lower die 37 move together in properly timed relation toward the fine wire 22. In FIGURE 4, the lower die 37 first moves upwardly to the level of the top face of jaw electrode 19 which is supporting the fine wire 22. The top face 41 of the lower die and the top extremity of the die projection 39 and the upper face of the jaw electrode 19 are all at the same elevation in FIGURE 4, prior to the severing of the fine wire 22, and the lower die 37 supports the metal ribbon between the transverse extension 26 and the feeding and welding unit 18. The lower die 37 dwells at this point in the method.

With continued reference to FIGURE 4, while the lower die 37 is stationary and supporting the fine wire 22, the upper die 27 and cutting blade 28 descend, and the cutting edge 29 being in advance of the upper die projection 34 cleanly severs the metal ribbon 22 against the square corner 42 of the lower die. At the instant of severing of the fine wire 22, the beveled face 31 and rounded shoulder 32 of the cutting blade 28 will begin to form or bend the leading end of the metal ribbon over the forming shoulder 23' and leading end 23 of the jaw electrode 19 for forming on the leading end of the fine wire 22, the next succeeding transverse extension 26 shown completed in FIGURE 5. The transverse extension 26 thus formed by the apparatus in FIGURES 4 and 5 will be welded to the end 14 of the next succeeding anode 11 which is placed upon the anvil 10 during the next complete cycle of operation in the practice of the method.

With reference to FIGURE 5, immediately following the severing of the fine wire 22 and the formation by the cutter 28 and jaw electrode 19 of the next transverse extension 26, the upper die 27 and cutter 28 continue to move toward the lower die 37, and the previously severed portion 43, FIGURE 4, of the fine wire 22, welded to the anode 11 and resting upon the lower die 37 is formed by the upper and lower dies into a substantially S-shaped cat whisker 44. The lower die 37 continues to dwell and remain stationary during the forming step shown in FIGURE 5, and the lower die 37 is in the same position relative to the wire element 12 and the feeding and welding unit 18 in FIGURES 4 and 5. During the formation of the cat whisker 44 by the dies 27 and 37, FIGURE 5, the outer face 33 of the cutter 28 continues to slide over and bear against the previously formed transverse extension 26 of the fine wire.

With continued reference to FIGURE 5, the previously severed fine wire portion 43, FIGURE 4, is engaged upon one side by the projection 34 of the upper die and on its opposite side by the projection 39 of the lower die. The die projections 34 and 39 move into interfitting side-by-side relation as shown in FIGURE 5, and this shapes or forms the severed fine wire portion 43 into the S-shaped cat whisker 44, as should be obvious. The upper die 27 has now completed its descent, and the flat faces 36 and 41 of the upper and lower dies continue to be spaced apart as shown in FIGURE 5. No part of the S-shaped cat whisker extends between the die faces 36 and 41 in FIGURE 5, due to the axial foreshortening of the severed fine wire portion during the formation of the cat whisker. The forward arm 45 of the cat whisker 44 is now at right angles to the longitudinal axis of the lead wire 12, and the upper end 46 of the cat whisker arm 45 is at the elevation of the top face 41 and the upper end of the lower die projection 39.

With reference to FIGURE 6, after complete formation of the cat whisker 44, the upper and lower dies 27 and 37 move apart and return to their relative positions shown in FIGURES 1 through 3. The cutter 28 moves with the upper die 27. This frees the cat whisker 44 from the forming dies and also frees the extension 26 from the outer face 33 of the cutter 28, FIGURE 6. The gripping jaw 16 is now moved upwardly from the stationary anvil 10 and the completed anode 11 is readily removed from the anvil and replaced by another anode without a cat whisker.

Upon completion of the method step shown in FIGURE 6, and after placement of a new anode 11 without a cat whisker between the anvil 10 and jaw 16, the apparatus is again in the position shown in FIGURE 1, and the cycle of operation of the apparatus is repeated for carrying out the method steps a desired number of times in the identical manner above-described.

In FIGURE 7 there is illustrated a modification of the method and the apparatus employed for practicing the method. FIGURE 7 corresponds substantially to FIGURE 5 and illustrates the step of forming the cat whisker subsequent to the welding and severing steps which are not separately shown in connection with the modification of FIGURE 7.

In FIGURE 7, the anvil 10 and clamping jaw 16 are again employed for holding the anode 11'. The same feeding and welding unit 18 for the fine wire 22 is employed, and an upper die 27' corresponding generally to the die 27 is utilized along with the cutting blade 28. A lower forming die 37' in FIGURE 7 corresponds generally to the lower die 37 previously described.

In FIGURE 7, the lower die 37' has an upper flat face 47 somewhat wider than the corresponding face 41 of lower die 37. The flat face 47 of lower die 37' is arranged at an elevation of one-half the thickness of the fine wire 22 below the aixal center line of the lead wire 12 of anode 11'. A narrow cutting blade portion 48 is formed upon the lower die 37' at one side thereof, and projects above the flat face 47 and has its top terminating in alignment with the top face of the jaw electrode 19. The lower die 37' is provided at its other side with an upstanding rounded forming projection 39', having its top arranged at the elevation of the top face of the jaw electrode 19 and the top of the cutting projection 48. The forming projecting 39' is identical with the forming projection 39, previously described. The lower die 37' also has a concave forming recess 40", corresponding to the previously described recess 40 of the die 37. However, the die recess 40" in FIGURE 7 is shallower on one side than the recess 40 due to the fact that the flat face 47 is at a lower elevation than the flat face 41. The lower die 37' also has a rounded shoulder 49 where the shorter side wall of the die recess 40" joins the flat face 47.

The upper forming die 27' has a depending forming projecting 34" corresponding to the projection 34 and the fillet 35 and square shoulder 35' previously described are also present. The upper die 27' has a leading flat face 36" corresponding to the face or shoulder 36 of die 27, but arranged to meet with the face 47 of the lower die when the dies are completely closed with the projections 39' and 34" interfitting. The lower corner of the upper die 27' is beveled at 50 to provide clearance for the cutting extension 48. The cutting edge 29 of cutter 28 is in advance of the die projection 34", just as in the prior form of the invention, and the die projections 34" and 39' are in advance of the respective flat faces 36" and 47.

With continued reference to FIGURE 7, during the practice of the modified method, the steps of feeding the fine wire 22 toward the anode 11' and electrically welding the transverse extension 26 to the end 14 of the lead wire 12 are carried out in the identical manner shown in FIGURES 1 through 3, while the upper and lower die means are separated. To avoid duplication of illustration, these steps have not been shown in the drawings in connection with the modification of FIGURE 7. After the feeding and welding unit 18 is retracted as in FIGURE 3, such unit is again in the position illustrated in FIGURE 1, and this position of the feeding and welding unit is shown in FIGURE 7. The lower forming die 37' now moves upwardly until the tops of the projection 39' and cutting projection 48 are level with the upper face of the jaw electrode 19. The projections 39' and 48 will now support the metal ribbon 22 between the welded extension 26 and the unit 18, and the lower die 37' now dwells.

The upper forming die 27' with the cutter 28 now descends and the cutting edge 29 coacts with the projection 48 to sever the fine wire 22 in the same manner described in connection with FIGURE 4. Substantially simultaneously, the cutter 28 coacts with the leading end of jaw electrode 19, FIGURE 7, to form the next succeeding transverse extension 26 upon the metal ribbon 22. Continued movement of the upper die 27' toward the lower stationary die 37' forms the severed metal ribbon portion into the modified S-shaped cat whisker 51 shown in FIGURE 7, which cat whisker is formed with a leading axial extension 52. Since the flat face 47 of the lower die is one-half the thickness of the metal ribbon below the axial center line of the lead wire 12, the longitudinal extension 52 of the modified cat whisker 51 will be exactly on the longitudinal center line of the anode 11'.

The die faces 36" and 47 are wider than the die faces 36 and 41, as stated. Accordingly, the cutter blade 28 is spaced a greater distance from the anode 11' in FIGURE 7 than from the anode 11 in the prior form of the invention. Hence, the severing of the fine wire 22 in FIGURE 7 occurs at a greater distance from the anode 11' than in the prior form of the invention, and the severed portion of the fine wire 22 before forming into the cat whisker 51 is longer than the severed portion 43 shown in FIGURE 4. Consequently, when the upper die 27', FIG- URE 7, moves downwardly to form the cat whisker 51, and the severed ribbon portion is foreshortened axially by the interengagement of the die projections 34" and 39", the part of the severed ribbon portion which constitutes a cat whisker extension 52 remains between the opposed flat die faces 36" and 47 in FIGURE 7.

After completion of the cat whisker 51, the dies 27' and 37' are separated as in FIGURE 6, and the work is freed from the dies and may now be separated from the anvil 10 and jaw 16, as described in the prior form of the invention. Another anode 11' without a cat whisker is now placed between the anvil 10 and jaw 16 and the cycle of operation of the apparatus during the practice of the method may be repeated.

In FIGURES 8 and 9 of the drawings, there is illustrated a modification of the method, wherein the method is carried out at two separate work stations, rather than at a single work station, as in the prior embodiments of the invention.

In FIGURES 8 and 9, the same S-shaped cat whisker 44 described in connection with the first form of the invention is applied to the anode 11. At a first work station, however, the anvil 10 and clamping jaw 16 hold the anode 11 adjacent to the feeding and welding unit 18, which is the identical unit described in connection with FIGURES 1 through 6.

At the first work station, FIGURE 8, the cutter 28 is secured to and movable with a vertical reciprocatory slide 53 which takes the place of the upper die 27 in FIGURE 1. The cutter 28 projects forwardly of the slide 53 which has a leading flat face 54, as shown. Below the slide 53, in opposed relation thereto, is a vertical reciprocatory severing anvil 55 having a flat top face 56 and a rounded shoulder 57. The severing anvil 55 has a vertical face 58 in alignment with the inner face of the cutter 28 and arranged at right angles to the face 56. The severing anvil 55 takes the place of the lower die 37 in FIGURE 1.

At the first work station, FIGURE 8, the transverse extension 26 is fed toward the end 14 of the lead wire 12 and pressed thereagainst and electrically welded thereto in the same manner previously described, while the slide and severing anvil 55 are separated. Subsequent to this, the unit 18 is retracted and the severing anvil 55 moves upwardly to support the fine wire 22 between the unit 18 and the anode 11, and the anvil 55 now stops or dwells. The slide 53 with cutter 28 now descends and the fine wire 22 is severed at the first work station and the next succeeding transverse extension 26 is formed on fine wire 22 by the coaction of the cutter 28 and jaw electrode 19, as previously described. The slide 53 and severing anvil 55 may now be separated, and the severed fine wire portion 43 remains welded to the anode 11 in FIGURE 8.

The anvil 10 and jaw 16 holding the anode 11 may now be shifted or indexed to position the work adjacent to upper and lower forming dies 59 and 60 at a second work station, FIGURE 9. If preferred, the anode 11 in FIGURE 8 may be removed from its holding means 10—16 and placed in identical holding means at the second work station. The forming dies 59 and 60 are substantially identical with the dies 27 and 37, FIGURE 1, and the dies 59 and 60 are now operated in the manner previously described in the first form of the invention to form the severed fine wire portion 43 into the S-shaped cat whisker 44. All other steps of the method are identical to previously described in connection with the prior forms of the invention.

In FIGURES 8 and 9, the feeding, welding and severing steps of the method are performed at the first work station, FIGURE 8, and the formation of the transverse extension 26 takes place at the first work station. The final formation of the S-shaped cat whisker 44 takes place at the second work station shown in FIGURE 9.

If desired, the forming dies employed at the second work station, FIGURE 9, may be the dies 27' and 37' of the FIGURE 7. In this case, the cat whisker formed at the second work station will be the modified cat whisker 51 having the axial extension 52, instead of the S-shaped cat whisker 44.

It is to be understood that the forms of the invention herewith shown and described are to be taken as preferred examples of the same, and that various changes in the shape, size and arrangement of parts, as well as changes in the method steps and/or their sequence, may be resorted to, without departing from the spirit of the invention or scope of the subjoined claims.

Having thus described my invention, I claim:

1. A single station continuous repetitive method of making diode elements comprising fixingly holding a lead wire with one end thereof exposed, feeding a fine wire from a supply toward said exposed end longitudinally of the lead wire, said fine wire having a transverse leading extension formed thereon during the immediately preceding complete cycle of method steps and having an accurate radius joining said extension and fine wire, pressing said extension against said exposed end and electrically butt welding said extension to said end while continuing to press the extension thereagainst, severing the fine wire at a point spaced from the butt welded extension to thereby provide a severed fine wire portion integral with said extension and of a length to be developed into a cat whisker, immediately thereafter bending over on the severed end of the fine wire from said supply a transverse extension having said accurate radius for use in the next succeeding complete cycle of method steps, substantially simultaneously forming the severed fine wire portion into a cat whisker having one transverse end portion thereof constituted by the first-named transverse extension, and repeating the cycle of method steps for the desired number of times.

2. A single station continuous repetitive method of making diode elements comprising fixedly holding a lead wire with one end thereof exposed, feeding a fine wire from a supply toward said exposed end axially of the lead wire, said fine wire having a first transverse leading extension formed thereon during the immediately preceding complete cycle of method steps, pressing said extension against said exposed end and electrically butt welding said extension to said end while continuing to press the extension thereagainst, severing the fine wire at a point spaced from the butt welded extension and thereby providing a severed fine wire portion integral with said extension of a length adapted to be developed into a generally S-shaped cat whisker, immediately thereafter forming on the severed end of the fine wire from said supply a second transverse extension for butt welding to another lead wire in the next succeeding complete cycle of method steps, and substantially simultaneously forming the severed wire portion into a generally S-shaped cat whisker having one transverse end portion thereof constituted by said first transverse extension butt welded to said exposed end of the first-named lead wire.

3. A single station continuous repetitive method of making diode elements comprising fixedly holding a lead wire with one end thereof projecting outside of the holding means, feeding a fine wire from a supply toward said one end of the lead wire, said fine wire having a first transverse leading extension formed thereon during the immediately preceding complete cycle of method steps, utilizing the feeding means to press said extension against said one end and to electrically butt weld the transverse extension to said one end while continuing to press the extension thereagainst, retracting the feeding means along the fine wire and away from the butt welded transverse extension, moving severing and forming die means toward opposite sides of the fine wire in the space between said transverse extension and the retracted feeding means to first sever the fine wire at a point spaced from the butt welded extension and between the latter and the feeding means and thereby providing a severed fine wire portion on said butt welded extension, immediately thereafter forming on the severed end of the fine wire from said supply a second transverse extension by coaction of said die means with said feeding means and substantially simultaneously utilizing the die means to form the severed fine wire portion into a generally S-shaped cat whisker having one transverse end portion thereof constituted by said first transverse extension butt welded to said one end of the lead wire, said second transverse extension adapted to be butt welded to another lead wire in the next succeeding complete cycle of method steps.

References Cited in the file of this patent

UNITED STATES PATENTS

| | | |
|---|---|---|
| 2,779,993 | Pityo | Feb. 5, 1957 |
| 2,881,369 | Carman | Apr. 7, 1959 |

FOREIGN PATENTS

| | | |
|---|---|---|
| 696,981 | France | Jan. 10, 1931 |